United States Patent [19]

Hancock

[11] 4,153,583

[45] May 8, 1979

[54] STABILIZED ANIONIC SURFACTANTS

[75] Inventor: Roger I. Hancock, Middlesbrough, England

[73] Assignee: Imperial Chemical Industries Limited, London, England

[21] Appl. No.: 873,954

[22] Filed: Jan. 31, 1978

[30] Foreign Application Priority Data

Jul. 11, 1977 [GB] United Kingdom ............... 28987/77

[51] Int. Cl.[2] ................................................ C11D 1/12

[52] U.S. Cl. .................................... 252/550; 252/132; 252/404; 252/531; 252/533; 252/552; 252/559

[58] Field of Search ............... 252/550, 552, 531, 559, 252/533, 132, 404

[56] References Cited

U.S. PATENT DOCUMENTS

| | | | |
|---|---|---|---|
| 3,329,617 | 7/1967 | Doering | 252/550 |
| 3,993,605 | 11/1976 | Scholz-Weigl et al. | 252/550 |

*Primary Examiner*—Mayer Weinblatt
*Attorney, Agent, or Firm*—Cushman, Darby & Cushman

[57] ABSTRACT

Anionic surfactants are stabilized by incorporating in them an alkane which is substituted by at least 3 hydroxyphenyl groups.

9 Claims, No Drawings

STABILIZED ANIONIC SURFACTANTS

The present invention relates to a stabilised composition particularly to a stabilised anionic surfactant composition.

The production of solid surfactant compositions containing anionic surfactants usually involves a drying stage in which the composition is heated. During this stage there is a tendency for the composition to darken in colour due, we believe, to oxidation of the anionic surfactant. We have now found that the darkening of the composition may, to a large extent, be avoided if a tris(hydroxyphenyl) alkane antioxidant is incorporated into the composition.

Accordingly, the invention comprises a composition containing an anionic surfactant and a stabilising amount of an alkane which is substituted by at least three hydroxyphenyl groups.

Suitable substituted alkanes include those of the formula:

$$ZCHX^1CHR^1R^2$$

in which $R^1$ and $R^2$ are hydroxyphenyl groups and in which Z is hydrogen, a phenyl or hydroxyphenyl group, an alkyl group or a group of formula $YCHX^2$ in which Y is hydrogen, a phenyl or hydroxyphenyl or alkyl group or a group of formula $X^3X^4HC(CH_2)_m$ in which m is 0 or an integer having a value of 1 to 4, in which at least one of $X^1$, $X^2$, $X^3$ and $X^4$ represents a hydroxyphenyl group the remainder being hydrogen.

It is preferred that each hydroxyphenyl group should be substituted in an ortho position relative to the —OH group by an alkyl group having from 1 to 8 carbon atoms. It is also preferred that this should be a tertiary group, for example a tert-butyl or a tert-octyl group. The hydroxyphenyl group is also preferably substituted by at least one further alkyl group again suitably having 1 to 8 carbon atoms, e.g. a methyl or tert-butyl group, in the other ortho- or in the meta- position. Preferred hydroxyphenyl groups are 1-hydroxy-3,6-dialkylphenyl groups.

Examples of particularly suitable substituted alkanes have the formulae:

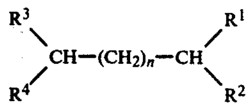

in which n is 0 or an integer in the range 1 to 4, and is preferably 3, and $R^1$, $R^2$, $R^3$ and $R^4$ are hydroxyphenyl groups, or the substituted alkane has the formula:

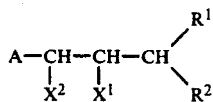

in which $R^1$ and $R^2$ are hydroxyphenyl groups and one of $X^1$ amd $X^2$ is a hydroxyphenyl group and the other is hydrogen, and 'A' is a methyl or phenyl group or hydrogen. A substituted alkane of the first type may be produced by condensing 3-methyl-6-tert-butylphenol with glutaraldehyde, n being in this case 3 and $R^1$ and $R^2$, $R^3$ and $R^4$ all being 1-hydroxy-3-methyl-6-tert-butylphenyl groups, and a substituted alkane of the second type may be produced by condensing 3-methyl-6-tert-butylphenol with crotonalkehyde or aldol, 'A' in this case being a methyl group and $R^1$ and $R^2$ and one of $X^1$ and $X^2$ being a 1-hydroxy-3-methyl-6-tert-butylphenyl group the other $X^1$ or $X^2$ being hydrogen.

The anionic surfactants which are most commonly used in solid compositions are carboxylates, sulphonates and sulphates. The carboxylates are typically sodium or potassium salts of $C_{12}$ to $C_{22}$ particularly $C_{12}$ to $C_{18}$ alkanoic acids. The sulphonates include sodium or potassium ammonium or triethanolamine alkane or alkene sulphonates in which the alkane or alkene group contains 10 to 20 particularly 12 to 18 carbon atoms or sodium or potassium alkylbenzene sulphonates in which the alkyl group contains 6 to 16 carbon atoms e.g. a linear $C_{12}$ alkyl group. The sulphate may be an alcohol sulphate e.g. a sodium, potassium, ammonium or triethanolamine $C_{10}$ to $C_{18}$ alcohol sulphate or a similar salt of an ethoxylated alcohol sulphate or ethoxylated alkylphenol sulphate, the number of ethylene oxide units typically being 1 to 5 and the alkyl group in the alkylphenol containing 6 to 16 carbon atoms. In general, the sodium salts are the most widely used derivatives.

Most solid surfactant compositions contain other ingredients apart from the anionic surfactant and in the composition according to the present invention there may also be present one or more of the following ingredients, a builder, e.g. sodium tripolyphosphate, a foam booster e.g. coconut oil mono- or di-ethanolamide, an anti-soil redeposition agent, e.g. sodium carboxymethylcellulose, an anti-corrosion agent e.g. sodium silicate, an optical brightener, a bleach e.g. sodium perborate, or sodium percarbonate, an alkali e.g. sodium carbonate, a filler e.g. sodium sulphate and, possibly, an enzyme. There may also be present in the composition another type of surfactant e.g. a non-ionic surfactant such as an alkoxylate, i.e. the product of reacting a substrate containing an active hydrogen atom with an alkylene oxide particularly with ethylene oxide and/or propylene oxide. Such substrates include alcohols e.g. $C_1$ to $C_{20}$ preferably $C_8$ to $C_{18}$ alkanols, glycols, e.g. propylene glycol, carboxylic acids e.g. $C_4$ to $C_{20}$ alkanoic acids and tall oil acids, amines e.g. $C_1$ to $C_{12}$ mono- di and polyamines, and phenols, e.g. alkyl substituted phenols particularly phenols substituted in the para-position with a $C_6$ to $C_{16}$ alkyl group. The alkoxylate chain in this type of product may contain up to 70 alkylene oxide units, but preferably it contains up to 50 particularly up to 30 units. Under the conditions encountered in drying solid surfactant compositions according to the invention the alkoxylate non-ionic surfactants are themselves unstable and are also protected from degradation by the presence of the tris-(hydroxyphenyl)alkane (see our copending British Patent Application No. 6685/77).

The compositions according to the invention are customarily manufactured in solid form by a spray drying process and it is during this process that the compositions are most prone to degradation. Although the spray drying process may be carried out in a number of ways it usually involves an aqueous solution of the components of the composition being contacted in droplet form with a cocurrent or countercurrent of hot air (up to 400° C.) whereby the water is evaporated leaving a mass of fluffy granules.

The composition according to the invention preferably contains 0.0005 to 5.0 wt % of the tris (hydroxyphenyl) alkane more preferably 0.005 to 5.0 wt % based on the weight of anionic surfactant.

The amount of surfactant in the composition (anionic or anionic plus nonionic) varies depending upon the duty for which the composition is required. For heavy duty there may be present 5 to 25 wt % surfactant while for light duty the figures may vary between 15 and 40 wt %. The balance of such compositions may then be made up by the other conventional components listed earlier in this specification, the heavy duty product containing a builder as a significant component (30 to 60 wt %) while the light duty product generally contains a large amount of filler (50 to 75 wt %).

EXAMPLE

A composition typical of the present invention consists of:

| | | |
|---|---|---|
| sodium para-n-dodecylbenzene sulphonate | 15% | w/w |
| coconut oil monoethanolamine | 2% | " |
| tallow soap | 5% | |
| 'TOPANOL' CA* | 0.2% | " |
| sodium tripolyphosphate | 35% | |
| sodium carbonate | 20% | |
| sodium silicate | 5% | |
| carboxymethylcellulose | 0.4% | |
| Ethylene-diamine tetra-acetic acid | 0.4% | |
| Water | 17% | |

*'TOPANOL' CA is tris-(2-methyl-4-hydroxy-5-tertbutylphenyl) butane and the word 'TOPANOL' is a registered trademark.

I claim:

1. A composition comprising: an anionic surfactant selected from the group consisting of sodium and potassium salts of $C_{12}$ to $C_{18}$ alkanoic acids, sodium, potassium, ammonium, and triethanol amine salts of alkane and alkene sulphonic acids in which the alkane or alkene group contains 10 to 20 carbon atoms, sodium and potassium alkylbenzene sulphonates in which the alkyl group contains 6 to 16 carbon atoms, sodium, potassium, ammonium and triethanolamine salts of $C_{10}$ to $C_{18}$ alcohol sulphates and sodium, potassium, ammonium and triethanolamine salts of ethoxylated alcohol sulphates and ethoxylated alkylphenol sulphates; and a stabilizing amount, in the range 0.0005 to 5% by weight based on the anionic surfactant of an alkane which is substituted by at least 3 hydroxyphenyl groups having the formula:

$$ZCHX^1CHR^1R^2$$

in which $R^1$ and $R^2$ are hydroxyphenyl groups and in which Z is hydrogen, a phenyl or hydroxyphenyl group, an alkyl group or a group of formula $YCHX^2$ in which Y is hydrogen, a phenyl or hydroxyphenyl or alkyl group or a gorup of formula $X^3X^4HC(CH_2)_m$ in which m is 0 or an integer having a value of 1 to 4, in which at least one of $X^1$, $X^2$, $X^3$, and $X^4$ represents a hydroxyphenyl group the remainder beng hydrogen.

2. A composition according to claim 1 in which the tris(hydroxyphenyl)alkane is tris-(2-methyl-4-hydroxy-5-tert-butylphenyl)butane.

3. A composition according to claim 1 which contains 0.0005 to 5.0 wt % based on the weight of anionic surfactant of the tris (hydroxyphenyl) alkane.

4. A composition according to claim 1 in which the substituted alkane has the formula

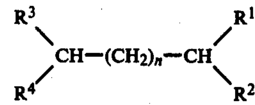

in which n is 0 or an integer in the range 1 to 4 and $R^1$, $R^2$, $R^3$ and $R^4$ are hydroxyphenyl groups, or the substituted alkane has the formula

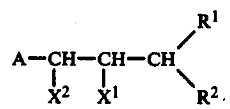

in which $R^1$ and $R^2$ are hydroxy phenyl-groups and one of $X^1$ and $X^2$ is a hydroxyphenyl group and the other is hydrogen and 'A' is a methyl or phenyl group or hydrogen.

5. A composition as claimed in claim 4 in which:

(a) the substituted alkane has the formula I and n is 3 and $R^1$, $R^2$, $r^3$ and $R^4$ are all 1-hydroxy-3-methyl-6-tertbutylphenyl groups or, (b) the substituted alkane has the formula II and 'A' is a methyl group and $R^1$ and $R^2$ and one of $X^1$ and $X^2$ are 1-hydroxy-3-methyl-6-tertbutyl phenyl groups and the other $X^1$ or $X^2$ is hydrogen.

6. A composition according to claim 1 when subjected to a spray drying process.

7. A composition according to claim 6 in which the hydroxyphenyl groups are 1-hydroxy-3,6-dialkylphenyl groups.

8. A composition according to claim 6 in which each hydroxyphenyl group in the substituted alkane is substituted in an ortho- position relative to the —OH group by a tert alkyl or cyclo-alkyl group having from 1 to 8 carbon atoms.

9. A composition according to claim 8 in which the hydroxyphenyl group is substituted by at least one further alkyl group in the other ortho- or meta-position.

* * * * *